May 26, 1953     A. R. COOPER     2,639,929
MOWER WHEEL SEAL
Filed June 7, 1947
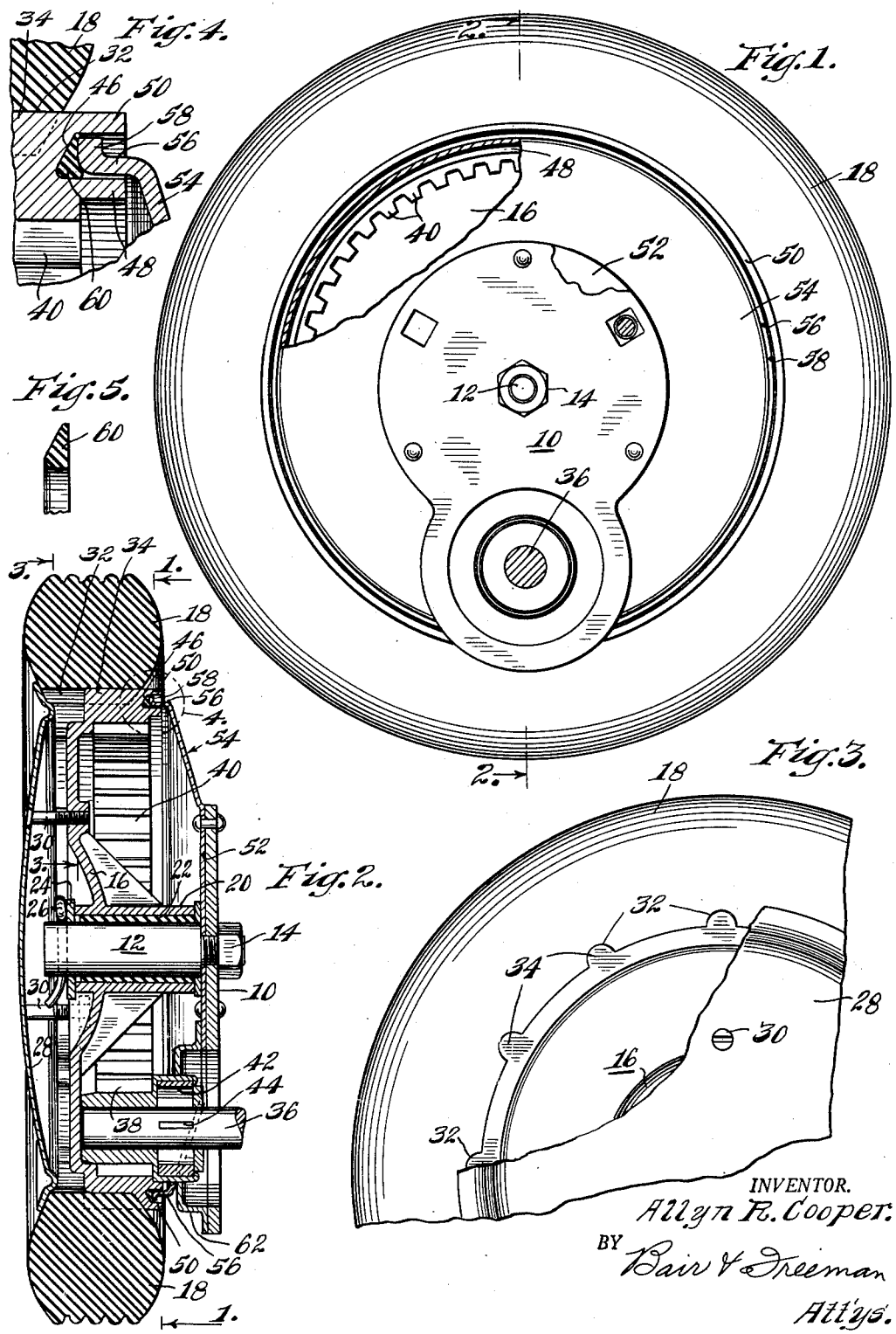
INVENTOR.
Allyn R. Cooper.
BY Bair & Freeman
Attys.

Patented May 26, 1953

2,639,929

UNITED STATES PATENT OFFICE 2,639,929

MOWER WHEEL SEAL

Allyn Ranft Cooper, Marshalltown, Iowa, assignor of one-half to Harold M. Cooper, Marshalltown, Iowa Application June 7, 1947, Serial No. 753,289

1 Claim. (Cl. 286—11.13)

This invention relates to a sealing means for the wheel of a lawn mower with respect to the frame of the machine in order to exclude foreign matter such as grass, dirt and the like from the gearing and ratchet mechanism of the lawn mower.

One object of the invention is to provide a wheel which is simple and inexpensive to manufacture yet effective for the purpose of efficiently excluding grass clippings and dirt from the space between a disc of the wheel and a stationary disc mounted on the frame of the machine.

Another object is to provide an arrangement which permits use of a die cast wheel with an annular groove therein and a stamped sheet metal stationary disc having an annular peripheral flange entering the annular groove of the wheel, whereby a tortuous path is provided to aid in excluding foreign matter from the gearing and ratchet mechanism of the mower, and in which a gasket of pliable material may be positioned to produce maximum efficiency in sealing.

With these and other objects in view, my invention consists in the construction, arrangement and combination of the various parts of my seal whereby the objects contemplated are attained, as hereinafter more fully set forth, pointed out in my claim and illustrated in the accompanying drawings, wherein:

Figure 1 is an inside elevation of a mower wheel and an associated stationary disc for sealing the wheel against entry of foreign matter.

Figure 2 is a vertical sectional view on the line 2—2 of Figure 1, the section line 1—1 of Figure 2 indicating the section plane on which a broken away portion of Figure 1 has been taken.

Figure 3 is a sectional view on the line 3—3 of Figure 2 showing the mounting of a rubber tire on the wheel of the mower.

Figure 4 is an enlarged sectional view of that portion of Figure 2 contained within the circle 4, and Figure 5 is a similar sectional view of a sealing ring installed in Figure 4 and showing it in its initial shape.

On the accompanying drawing I have used the reference numeral 10 to indicate a frame plate of a lawn mower. The lawn mower in this instance has two of these plates, one at each end of the frame, but no attempt has been made to show the frame of the mower as it forms no part of my present invention. The end plates 10 are suitably connected together by the mower frame.

A main axle stud 12 is supported on the end plate 10 by means of a lock nut 14 threaded thereon. A wheel comprising a disc 16 and a tire 18 is journaled on the main axle stud 12. The disc 16 has a hub 20 rotatable around the stud with a bronze or needle type bearing at 22. The wheel is held in position by a washer 24 and a cotter key 26.

The tire 18 is held in position on the disc 16 by a cover disc 28 and screws 30. The tire is provided with cross grooves 32 fitting cross beads 34 of the disc 16 to insure rotation of the disc 16 with the tire 18.

A cutter reel shaft is illustrated at 36. This is of the usual type having a cutter reel thereon (not shown) and each end of the shaft is extended into a wheel of the mower. In Figure 2 the left hand end of the shaft is extended into the disc 16 and has a pinion 38 rotatable thereon and meshing with internal gear teeth 40 of the wheel 16. The usual ratchet 42 and pawl 44 are provided for permitting rotation in one direction and preventing it in the other.

The disc 16 is preferably die cast for accuracy of shape and minimization of machining operations, and is provided with an annular groove 46 between a pair of annular flanges 48 and 50. A cover disc 52 is secured to the frame plate 10 and has a truncated cone shaped portion 54 terminating in a cylindrical flange 56 and an outturned flange 58. The flanges 56 and 58 are located in the groove 46 with some clearance to prevent metal to metal rubbing of the parts, and a resilient sealing ring 60 of rubber, rubber composition or the like, of the triangular cross section shown in Figure 5, is inserted in the groove to occupy a position between the bottom of the groove and flange 58. The parts are so dimensioned that the sealing ring is slightly compressed as in Figure 4 so as to provide an efficient sealing means.

My sealing means is somewhat effective to prevent the entrance of foreign material into the space between the discs 16 and 54 due to the shape of the parts 46, 48, 50, 56 and 58 which provide a tortuous path of entry of such material. The sealing ring 60 then makes the seal one-hundred percent efficient by closing the space due to the thickness of the seal being slightly greater than the space. The seal being resilient (compare Figure 5 with Figure 4) insures that any unevenness of manufacture will not prevent a perfect seal from being had.

With my arrangement, foreign matter such as grass clippings, dirt, sand, etc. are excluded from the operating mechanism of the mower wheel, thus minimizing wear between the pinion 38 and the gear teeth 40 and in the ratcheting mechanism. These parts accordingly last much longer and may be kept in better lubricated condition much longer than where no seal is provided. At the same time the seal is made possible with a construction that is not expensive to manufacture.

The disc 52 and its portion 54 are cut away to permit entry of the pinion 38 and the ratcheting mechanism 42—44 into the space between the discs 16 and 52 for proper cooperation with the gear teeth 40. A housing 62 may be provided in which a suitable bearing (not shown) for the reel shaft 36 is located. Thus the stationary disc 52 does not in any way interfere with the operative connection between the traction wheels and the mower reel.

Some changes may be made in the construction and arrangement of the parts of my device without departing from the real spirit and purpose of my invention, and it is my intention to cover by my claim any modified forms of structure or use of mechanical equivalents which may be reasonably included within its scope.

I claim as my invention:

A device including two relatively rotating opposed discs and means holding said two discs in a predetermined spaced relationship, said device including a first disc having an annular groove having generally parallel side walls extending axially of said first disc and a bottom wall extending at an angle with respect to the plane of said first disc, a sealing ring of triangular cross sectional form disposed in said groove so as to have one side extending generally parallel to the plane of said first disc, and a second disc having a cylindrical flange with the free flange margin disposed in said disc groove in compressing engagement with the said one side of said sealing ring but spaced from the side walls of said groove.

ALLYN RANFT COOPER.

References Cited in the file of this patent

UNITED STATES PATENTS

| Number | Name | Date |
|---|---|---|
| 217,374 | Hill | July 8, 1879 |
| 425,756 | Conway | Apr. 15, 1890 |
| 478,466 | Richards | July 5, 1892 |
| 622,041 | Grant | Mar. 28, 1899 |
| 691,813 | Saxton | Jan. 28, 1902 |
| 784,442 | Smith | Mar. 7, 1905 |
| 1,303,066 | Jeffries | May 6, 1919 |
| 1,382,089 | Johnston et al. | June 21, 1921 |
| 1,664,721 | Worthington | Apr. 3, 1928 |
| 1,930,708 | Cunningham | Oct. 17, 1933 |
| 2,138,786 | Funk | Nov. 29, 1938 |
| 2,479,810 | Bradley | Aug. 23, 1949 |
| 2,551,018 | Lambert | May 1, 1951 |